(12) United States Patent
Zhou et al.

(10) Patent No.: US 7,463,453 B2
(45) Date of Patent: Dec. 9, 2008

(54) HEAD ARM ASSEMBLY, HEAD STACK ASSEMBLY AND DISK DRIVE UNIT USING THE SAME

(75) Inventors: HaiMing Zhou, HongKong (CN); Huai Yang, DongGuan (CN); HaiHua Jiang, DongGuan (CN); Fei He, DongGuan (CN); JianBin Zhang, DongGuan (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 591 days.

(21) Appl. No.: 10/909,422

(22) Filed: Aug. 3, 2004

(65) Prior Publication Data

US 2006/0028767 A1    Feb. 9, 2006

(51) Int. Cl.
G11B 5/48 (2006.01)
(52) U.S. Cl. .................................. 360/244.2
(58) Field of Classification Search .............. 360/244.2, 360/244.8, 245, 245.1, 245.2, 245.3, 245.4, 360/245.5
See application file for complete search history.

(56) References Cited

U.S. PATENT DOCUMENTS

| | | | | |
|---|---|---|---|---|
| 5,019,931 A * | 5/1991 | Ohwe et al. | ............... | 360/245.3 |
| 5,901,430 A * | 5/1999 | Ziegler et al. | ............ | 29/603.06 |
| 6,147,840 A * | 11/2000 | Khan | ...................... | 360/245.9 |
| 6,373,662 B1 * | 4/2002 | Blaeser et al. | ........... | 360/245.5 |
| 6,466,413 B1 * | 10/2002 | Takasugi | ................. | 360/245.9 |
| 6,549,375 B1 * | 4/2003 | Crane et al. | .............. | 360/245.3 |
| 6,747,848 B2 * | 6/2004 | Kasajima et al. | ......... | 360/245.3 |
| 6,771,469 B2 * | 8/2004 | Lindrose | .................. | 360/244.2 |
| 6,894,873 B2 * | 5/2005 | Kasajima et al. | ......... | 360/245.3 |
| 7,006,333 B1 * | 2/2006 | Summers | ................. | 360/294.4 |
| 7,099,118 B2 * | 8/2006 | Hutchinson et al. | ...... | 360/245.9 |
| 7,152,303 B2 * | 12/2006 | Childers et al. | .......... | 29/603.06 |
| 7,159,228 B2 * | 1/2007 | Mizuno et al. | .............. | 720/672 |
| 7,283,332 B2 * | 10/2007 | Weber | ..................... | 360/245.5 |

\* cited by examiner

*Primary Examiner*—Angel A. Castro
(74) *Attorney, Agent, or Firm*—Oliff & Berridge, PLC (57) ABSTRACT

A head arm assembly comprises a slider, a drive arm, a trace; and a load beam having a hinge portion and a slider mounting portion; wherein the slider mounting portion has a slider support portion to support flying attitude of the slider. The slider support portion has a slider mounting frame with a flexible lifter to maintain the slider position in a predetermined position. In the present invention, the flexible lifter has a spring structure. The load beam may further comprise a stiffener formed in a longitudinal direction of the head arm assembly. The invention also discloses a head stack assembly and a disk drive using the head arm assembly.

12 Claims, 8 Drawing Sheets

FIG. 1

(Prior Art)

FIG. 2

(Prior Art)

FIG. 3

(Prior Art)

HEAD ARM ASSEMBLY, HEAD STACK ASSEMBLY AND DISK DRIVE UNIT USING THE SAME

FIELD OF THE INVENTION

The present invention relates to head arm assemblies, head stack assemblies and disk drive units.

BACKGROUND OF THE INVENTION

Disk drives are information storage devices that use magnetic media to store data. A typical disk drive unit in related art comprises a magnetic disk and a head stack assembly (abbreviated as "HSA", HSA with only one HGA is referred as "HAA" (head arm assembly)). The magnetic disk is mounted on a spindle motor which causes the magnetic disk to spin and a voice-coil motor (VCM) is provided for controlling the motion of the HSA and thus controlling slider (not labeled) on the HSA to move from track to track across the surface of the magnetic disk to read data from or write data to the magnetic disk.

Figure 1:
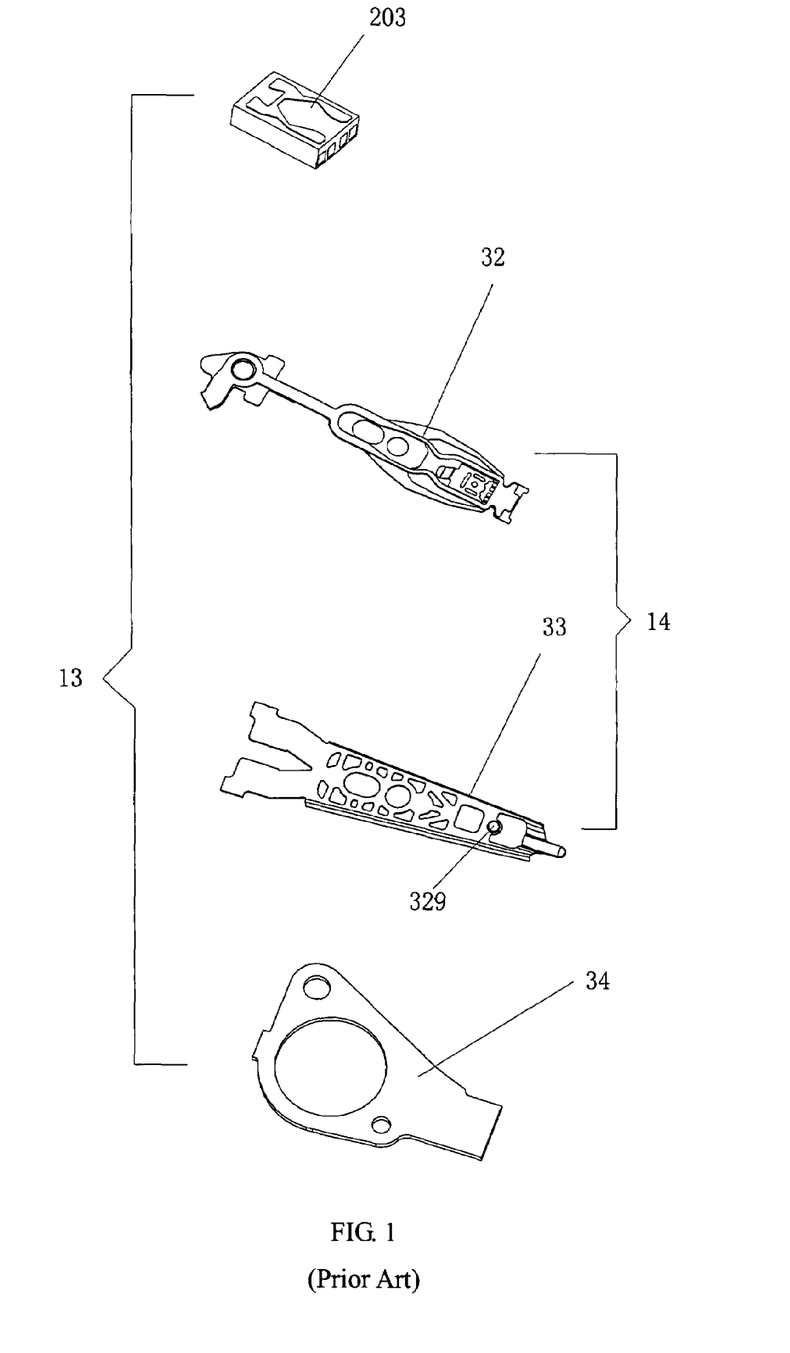
FIG. 1 is an exploded, perspective view of a traditional HAA.
Figure 2:
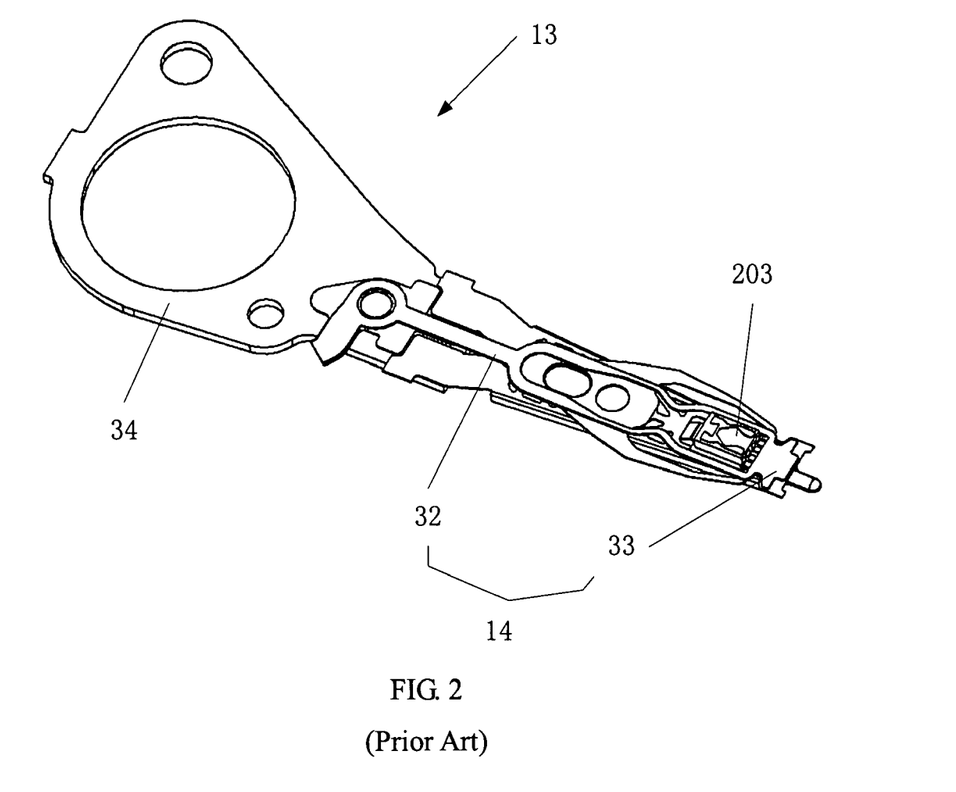
FIG. 2 is a perspective view of the assembled HAA of FIG. 1.
Figure 3:
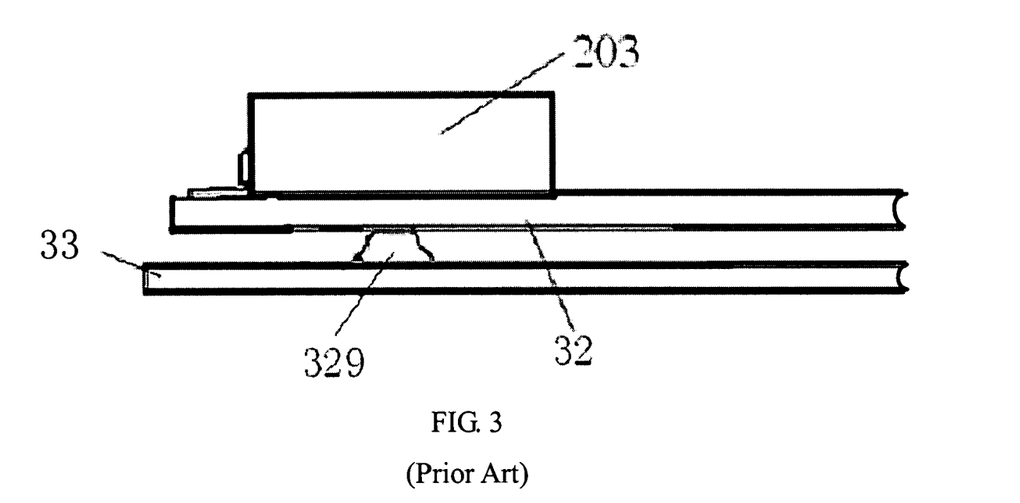
FIG. 3 is a cross-sectional view of FIG. 2 according to slider area of the HAA.

Referring to FIGS. 1 and 2, a traditional HAA 13 comprises a drive arm 34, a suspension 14 coupled with the drive arm 34, and a slider 203 mounted on the suspension 14 (the suspension 14 with the slider 203 is referred as "HGA"). In the related art, as shown in FIG. 1, the suspension 14 comprises a flexure 32 and a load beam 33. A dimple 329 is formed on the load beam 33 to support the flexure 32. Referring to FIG. 3, when the slider 203 is mounted on the flexure 32, the loading force keeps being applied to the center area of the slider 203 through the dimples 329 of the load beam 33.

However, the traditional HAA has not a good shock performance because of its rather large and complicated structure. The structures of the traditional HAA not only influence its static performance, but also influence its dynamic performance. At the same time, with the disk drive units being widely used in many consumer electronics products, such as PDA, cell phone, digital camera, digital video, etc, the shock performance of the HAA used by the disk drive unit is more important for these precise products. In addition, the complicated structure of the HAA also makes the manufacturing and assembly process of the disk drive unit rather time-consuming, and accordingly increases the cost of manufacturing disk drive unit.

Hence, it is desired to provide a head arm assembly which can attain a better shock performance and overcome the above-mentioned shortcomings.

SUMMARY OF THE INVENTION

A main feature of the present invention is to provide a HAA with small mass and a good shock performance, and a disk drive unit having such a HAA.

Another feature of the present invention is to provide a HSA with small mass and a good shock performance, and a disk drive unit having such a HSA.

To achieve the above-mentioned features, a HAA of the present invention comprises a slider, a drive arm, a trace; and a load beam having a hinge portion and a slider mounting portion. The slider mounting portion has a slider support portion to support flying attitude of the slider. In the present invention, the slider support portion has a slider mounting frame with a flexible lifter to maintain the slider position in a predetermined position. The flexible lifter has a spring structure. In an embodiment, the load beam further comprises a stiffener formed in a longitudinal direction of the head arm assembly. As an embodiment, the stiffener is at least one rail formed between the hinge portion and a slider mounting portion. Each of the rails is formed by bending the side portion of the load beam. In a further embodiment, a lift tab extends from the hinge portion to front end of the slider mounting portion.

A head stack assembly comprises at least one head arm assemblies; wherein each of the head arm assemblies comprises a slider, a drive arm, a trace; and a load beam having a hinge portion and a slider mounting portion. In the present invention, the slider mounting portion has a slider support portion to support flying attitude of the slider.

A disk drive unit of the present invention comprises a disk, a spindle motor to spin the disk; and at least one head arm assemblies. Each of the head arm assemblies comprises a slider, a drive arm, a trace; and a load beam having a hinge portion and a slider mounting portion; wherein the slider mounting portion has a slider supporter to support flying attitude of the slider.

Compared with the prior art, firstly, because the HAA (HSA, disk drive) of the present invention has no additional flexure so as to omit the manufacturing process of the flexure and the assembly process with the load beam. Thus, it makes manufacturing HAA (HSA, disk drive) much easily and accordingly lows down the manufacturing cost thereof. In addition, omitting the additional flexure can also reduce the whole height and weight of the HAA (HSA, disk drive), that is, reducing the whole mass of the HAA (HSA, disk drive). This is because the related art must superpose the flexure with the load beam in a certain area for assembling them together, and accordingly the superposing portions of the flexure and the load beam will increase the whole height and weight of the HAA (HSA, disk drive). At the same time, reducing the weight of HAA (HSA, disk drive) will decrease its inertia and then attain a good shock performance. Furthermore, a stiffener, i.e. rails, is provided on the hinge portion so that the load beam is stiff enough to urge the slider to maintain a desired position relative to disk surface.

For the purpose of making the invention easier to understand, several particular embodiments thereof will now be described with reference to the appended drawings in which:

DETAILED DESCRIPTION OF THE INVENTION

Figure 4:
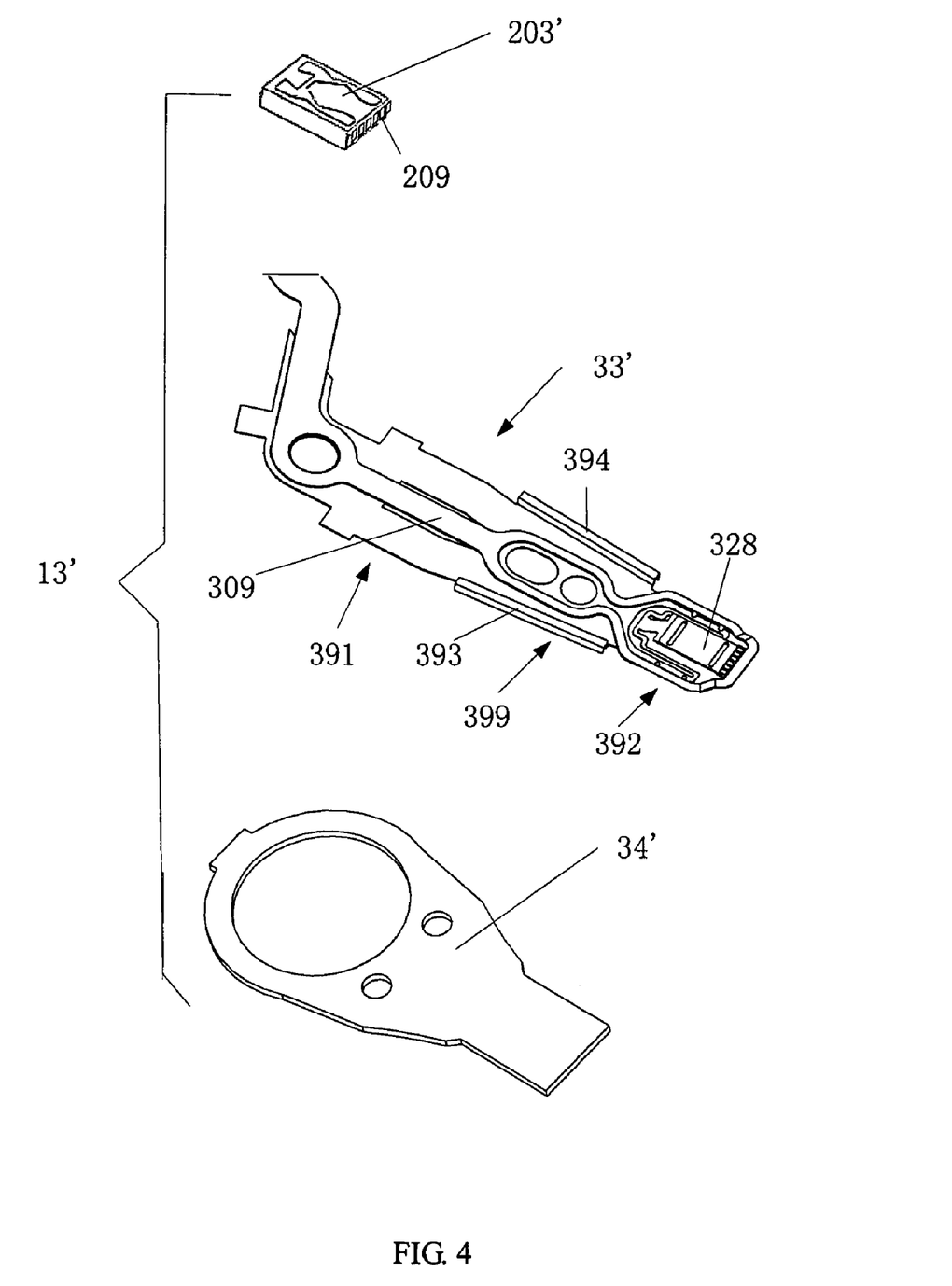
FIG. 4 is an exploded, perspective view of a HAA according to a first embodiment of the present invention.

According to a first embodiment of the present invention, referring to FIG. 4, a HAA 13' comprises a slider 203', a drive arm 34' and a load beam 33' to load the slider 203'. The load beam 33' has an integral structure and electric traces 309 formed thereon.

In the present invention, the load beam 33' is an interconnecting piece where the electric traces 309 is integrated therewith and provide conductivity between a PCBA (not shown) and the slider 203'. In the invention, the load beam 33' can be made by a laminate, such as trace suspension assembly (TSA), circuit integrated suspension (CIS), or flex suspension assembly (FSA). After the load beam 33' are formed, it will be coupled to the drive arm 34' by welding or other traditional method.

Referring to FIG. 4, the load beam 33' comprises a hinge portion 391, a slider mounting portion 392 and a connecting portion 399 to connect the hinge portion 391 and the slider mounting portion 392. In the present invention, when a force is applied to the slider 203', it will cause a shearing force to exert in the load beam 33'. As is known to all, an object is easily deformed when being applied to a shearing force while pressing force and/or pulling force only cause a little deformation of the object to which being applied. In order to transfer the shearing force exerted in the load beam 33' into pressing force and/or pulling force, a stiffener is formed in a longitudinal direction of the load beam 33'. Thus, the deformation of the load beam 33' can be reduced, accordingly, the stiffness of the load beam 33' is increased greatly so that a load-unload operation can be successfully processed. In an embodiment, referring to FIG. 6, the stiffener is at least one rails, such as two rails 393, 394, which is formed by bending two side portions of the connecting portion 399. In addition, the rail 394 also serves as a lift tap which engages with and is lifted by a ramp 121 (see FIG. 10).

Referring to FIG. 4, the slider 203' has a plurality of electrical pads 209 on one end thereof. The slider mounting portion 392 has a slider support portion (not labeled) to support flying attitude of the slider 203'. In an embodiment of the invention, referring to FIGS. 6 and 7, the slider support portion has two side beams 409 each of which has an open end, and a slider mounting frame 402 to connect with the two side beams 409 by their open ends. The slider mounting frame 402 has a flexible lifter 400 to maintain the position of the slider 203' upper than the position of the two beams 409. The slider mounting frame 402 comprises two side beams 403 and a bottom beam 405 to connect with the side beams 403. The flexible lifter 400 has a spring structure which extends from the bottom beam 405. In an embodiment, the flexible lifter 400 comprises a suspension tongue 328 to support the slider 203', and a connection part 401 to connect the bottom beam 405 with the suspension tongue 328. In the present invention, because the load beam 33' has a stiffener (e.g. two rails 393, 394) for improving the stiffness thereof so that the load beam 33' is stiff enough to urge the slider 203' to maintain a desired position relative to disk surface. In addition, the flexible lifter 400 has a spring structure to make the slider 203' freely fly above the disk.

Figure 5:
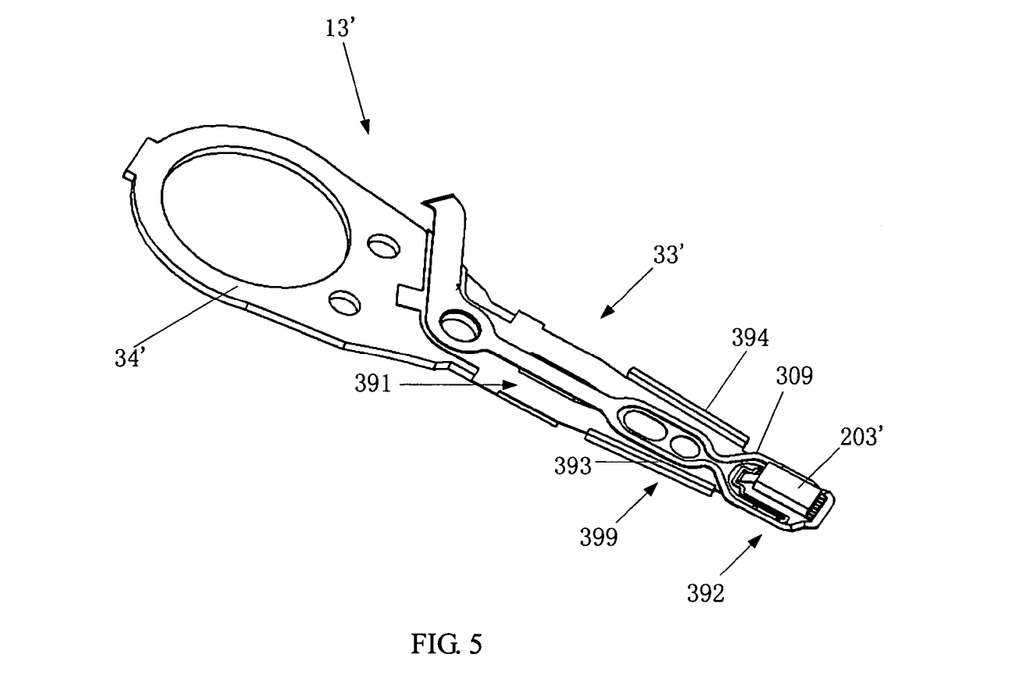
FIG. 5 is a perspective view of the assembled HAA of FIG. 4.
Figure 6:
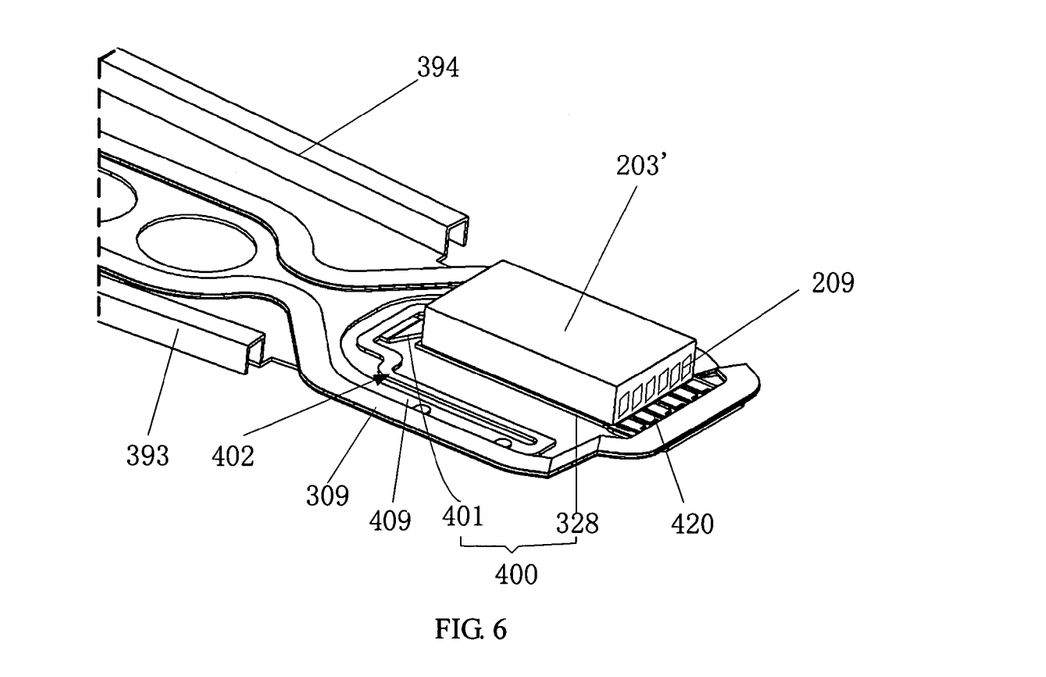
FIG. 6 is an enlarged, partial perspective view of FIG. 5 according to a first angle of view.
Figure 7:
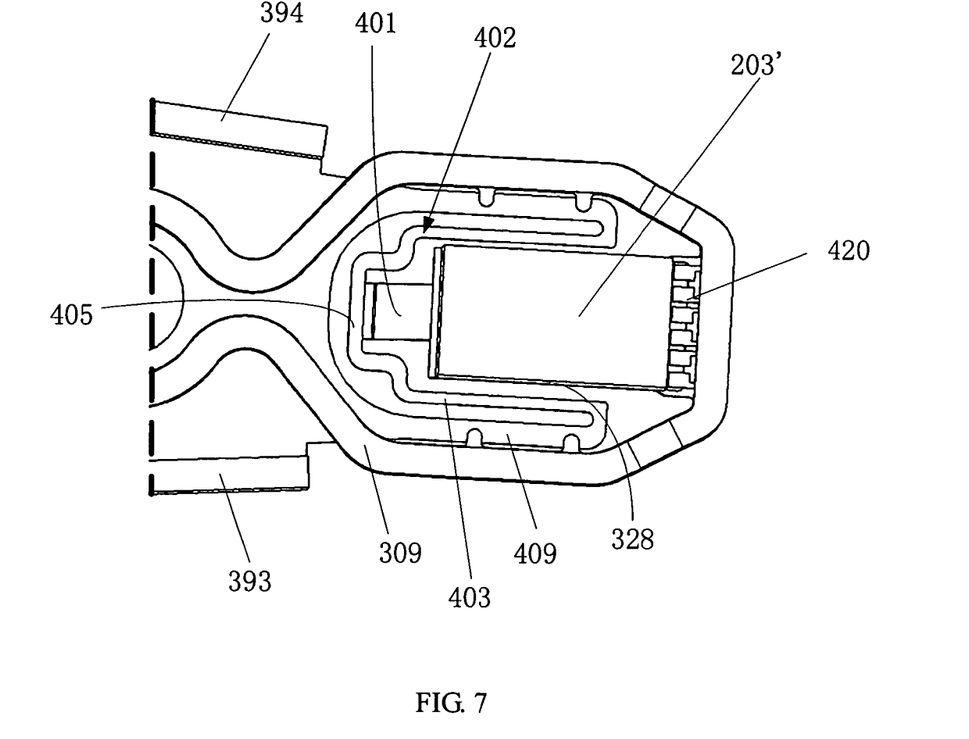
FIG. 7 is an enlarged, partial perspective view of FIG. 5 according to a second angle of view.
Figure 8:
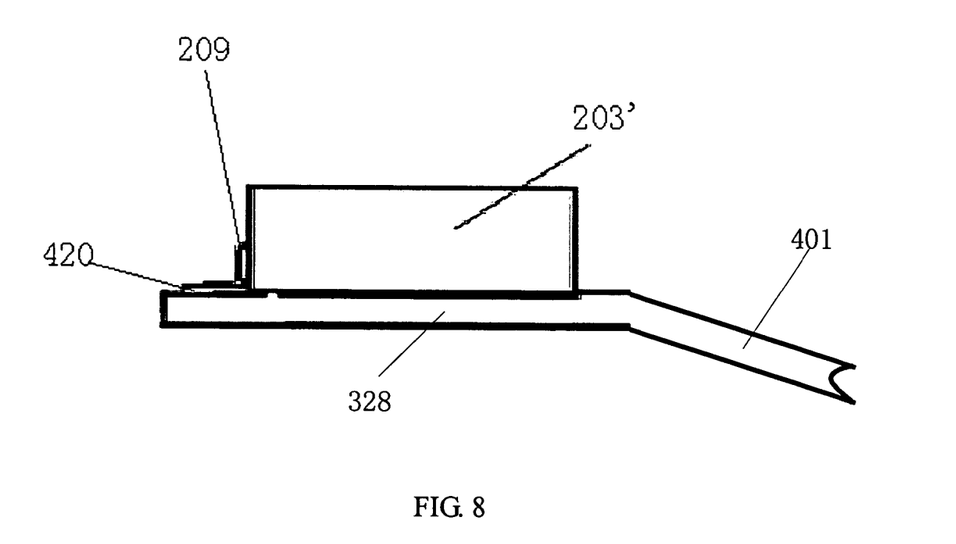
FIG. 8 is a cross-sectional view of FIG. 5 according to slider area of the HAA.

In the present invention, referring to FIGS. 5, 6 and 7, the suspension tongue 328 has a plurality of electrical pads 420 disposed on a predetermined position thereof corresponding to the electrical pads 209 of the slider 203'. Referring to FIG. 8, when the electrical pads 209 of the slider 203' are positioned corresponding to the electrical pads 420 of the suspension tongue 328, a plurality of metal balls (GBB or SBB, not shown) are provided to electrically connect the slider 203' with the suspension tongue 328. In the present invention, there is no dimple to support the suspension tongue 328, however, the slider 203' can still freely fly on the disk surface due to the spring structure of the flexible lifter 400.

Figure 9:
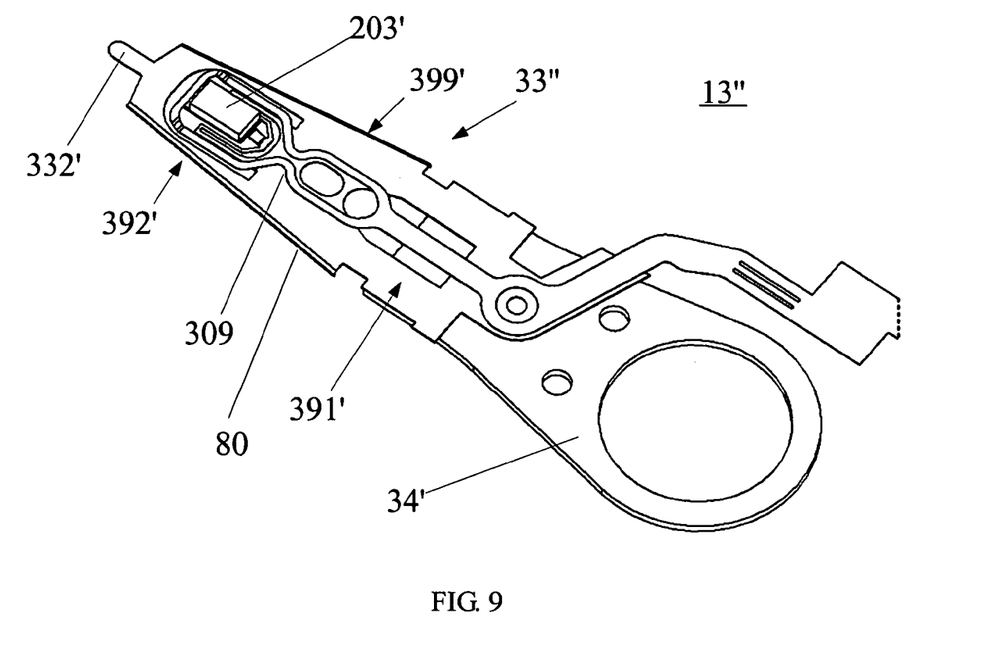
FIG. 9 is a perspective view of an assembled HAA according to a second embodiment of the present invention.

According to a second embodiment of the present invention, referring to FIG. 9, a HAA 13" comprises a load beam 33", a slider 203' mounted thereon, and a drive arm 34' coupled with the load beam 33". The load beam 33" comprises a hinge portion 391', a slider mounting portion 392' and a connecting portion 399' to connect the hinge portion 391' and the slider mounting portion 392'. A lift tab 332' extends from the connecting portion 399' to front end of the slider mounting portion 392'. Two rails 80 are formed from two side portions of the connecting portion 399' to two side portions of the slider mounting portion 392' in a longitudinal direction of the HAA 13". In the embodiment, no other change except the above-mentioned is happened on the structure of the HAA 13" comparing with the HAA 13'. Therefore, a detailed description thereof is omitted herefrom.

Figure 9A:
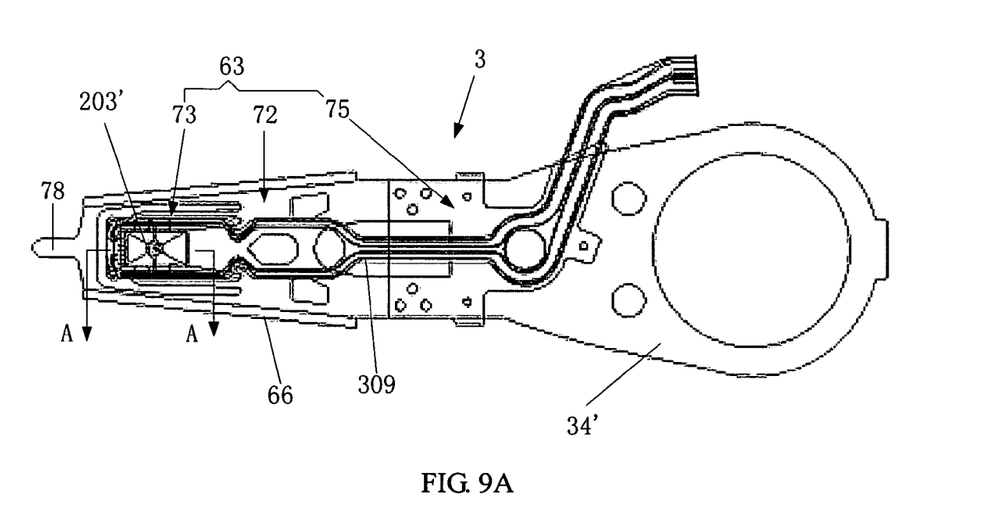
FIG. 9A is a perspective view of an assembled HAA according to a third embodiment of the present invention.
Figure 9B:
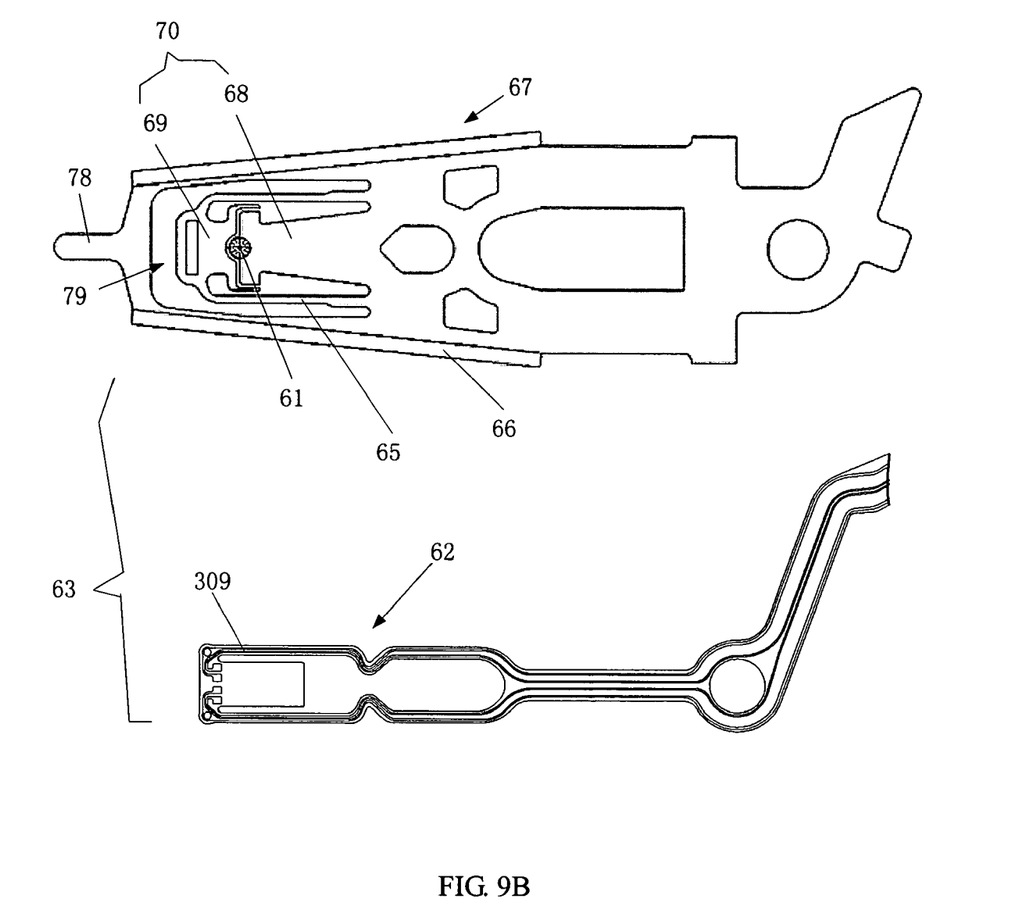
FIG. 9B is an exploded, perspective view of a load beam of the HAA in FIG. 9A.
Figure 9C:
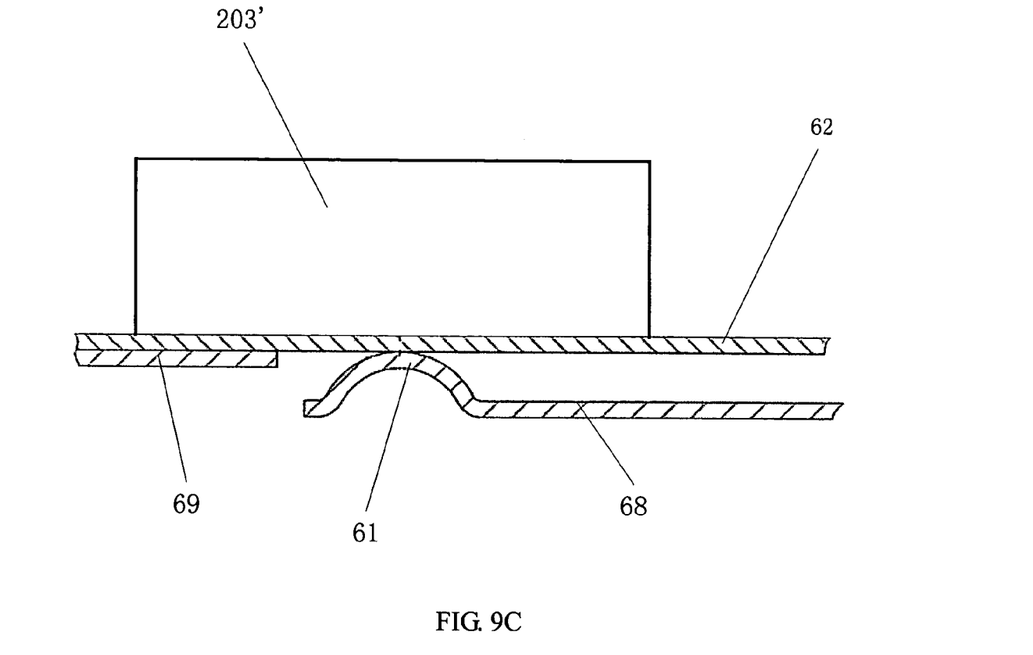
FIG. 9C is a cross-sectional view of the HAA in FIG. 9A taken along line A-A.

According to a third embodiment of the present invention, referring to FIG. 9A, a HAA 3 comprises a load beam 63, a slider 203' mounted thereon, and a drive arm 34' coupled with the load beam 63. In an embodiment, referring to FIGS. 9B-9C, the load beam 63 is made of FSA, which comprises a stainless steel substrate 67 and a flex on suspension (FOS) portion 62 on the stainless steel substrate 67. The FOS portion 62 is attached to the stainless steel substrate 67 with adhesive or other traditional method. As an embodiment, the FOS portion 62 is mainly made of polyimide (PI), which is formed a PI layer (insulation layer); electric traces 309 are built on the PI layer. In the embodiment, the load beam 63 comprises a hinge portion 75, a slider mounting portion 73 and a connecting portion 72 to connect the hinge portion 75 and the slider mounting portion 73. A lift tab 78 extends from the connecting portion 72 to front end of the slider mounting portion 73. Also, two rails 66 are formed from two side portions of the connecting portion 72 to two side portions of the slider mounting portion 73 in a longitudinal direction of the HAA 3. In the embodiment, the slider mounting portion 73 comprises a slider support portion 79 which has a flexible lifter 70. The flexible lifter 70 comprises a front tongue part 69 and a rear tongue part 68. The front tongue part 69 is connected with the connecting portion 72 by two side beams 65, while the rear tongue part 68 extends from the connecting portion 72 directly. A dimple 61 is formed on the end of the rear tongue part 68 adjacent to the front tongue part 69. When the slider 203' is mounted on the load beam 63, the dimple 61 leans against the FOS portion 62 and then supports the slider 203' to maintain the position of the slider 203' upper than the position of the two side beams 65. Obviously, the load beam can also be made of CIS or TSA, which has a similar structure to the load beam 63. In the present invention, a HSA also can be formed by assembled two or more HAA of the present invention (e.g. HAA 13', 13" or 3).

Referring to FIGS. 4-9C, in the present invention, the slider 203' are coupled with the load beam 63, 33' or 33" by epoxy glue or an epoxy-free bonding method. In an embodiment of the present invention, connecting the slider 203' with the load beam 63, 33' or 33" electrically are performed as follows (using the load beam 33' as an example): using a plurality of metal balls (GBB or SBB) to electrically connect the electrical pads 209 of the slider 203' with the electrical pads 420 so as to electrically connect the slider 203' with the electric multi-traces 309 of the load beam 33'. Through the electric multi-traces 309, the slider 203' can be connected with a PCBA (not shown).

Figure 10:
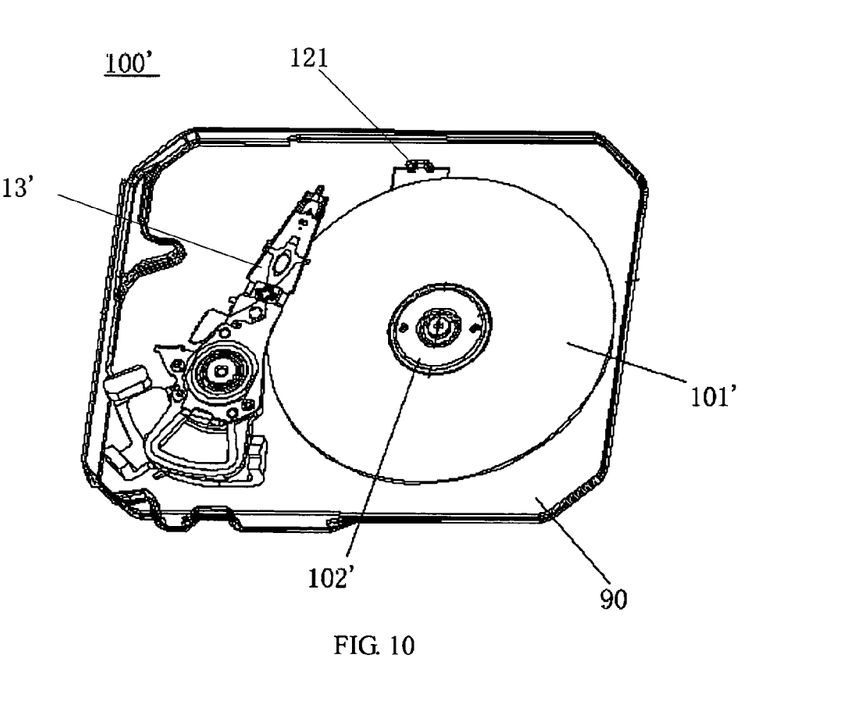
FIG. 10 is a perspective view of a disk drive unit according to an embodiment of the present invention.

In the present invention, referring to FIG. 10, a disk drive unit 100' of the present invention can be attained by assembling a disk drive housing 90, a disk 101', a spindle motor 102' with the HAA 13' (also can be HAA 3, 13" or HSA) of the present invention. Because the structure and/or assembly process of a disk drive unit by using the HAA 13' (also can be HAA 3, 13" or HSA) of the present invention are well known to persons ordinarily skilled in the art, a detailed description of such structure and assembly is omitted herefrom.

Comparing with the related art, the present invention omits an additional flexure so as to omit the manufacturing process of the flexure and the assembly process with the load beam. Thus, it makes manufacturing HAA (HSA, disk drive) much easily and accordingly lows down the manufacturing cost thereof. In addition, omitting the additional flexure can also reduce the whole height and weight of the HAA (HSA, disk drive). This is because the related art must superpose the flexure with the load beam in a certain area for assembling them together, and accordingly the superposing portions of the flexure and the load beam will increase the whole height and weight of the HAA (HSA, disk drive). At the same time, reducing the weight of HAA (HSA, disk drive) will decrease its inertia and then attain a good shock performance.

What is claimed is:

1. A head arm assembly comprising:
    a slider;
    a drive arm;
    a trace; and
    a load beam having a hinge portion and a slider mounting portion, the load beam being a one-piece structure, wherein
    the slider mounting portion has a slider support portion to support flying attitude of the slider, the slider support portion has a slider mounting frame with a flexible lifter to maintain the slider position in a predetermined position, the flexible lifter has a spring structure, the slider mounting frame includes two side beams and a bottom beam to connect with the two side beams, the flexible lifter connects with the bottom beam, the flexible lifter includes a suspension tongue to support the slider and a connection part to connect the suspension tongue with the bottom beam, and the connection part displaces the suspension tongue into substantially parallel, but out-of-plane, relationship with the main body of the load beam.

2. The head arm assembly as claimed in claim 1, wherein the load beam further comprises a stiffener formed in a longitudinal direction of the head arm assembly.

3. The head arm assembly as claimed in claim 2, wherein the stiffener is at least one rail formed between the hinge portion and the slider mounting portion.

4. The head arm assembly as claimed in claim 3, wherein the rail is formed by bending the side portion of the load beam.

5. The head arm assembly as claimed in claim 2, wherein a lift tab is formed on front end of the slider mounting portion.

6. A head stack assembly comprising:
    at least one head arm assembly; wherein each of the head arm assemblies comprising:
    a slider;
    a drive arm;
    a trace; and
    a load beam having a hinge portion and a slider mounting portion, the load beam being a one-piece structure, wherein
    the slider mounting portion has a slider support portion to support flying attitude of the slider, the slider support portion has a slider mounting frame with a flexible lifter to maintain the slider position in a predetermined position, the flexible lifter has a spring structure, the slider mounting frame includes two side beams and a bottom beam to connect with the two side beams, the flexible lifter connects with the bottom beam, the flexible lifter includes a suspension tongue to support the slider and a connection part to connect the suspension tongue with the bottom beam, and the connection part displaces the suspension tongue into substantially parallel, but out-of-plane, relationship with the main body of the load beam.

7. The head stack assembly as claimed in claim 6, wherein the load beam further comprises a stiffener formed in a longitudinal direction of the head arm assembly.

8. The head stack assembly as claimed in claim 6, wherein a lift tab is formed on front end of the slider mounting portion.

9. A disk drive unit comprising:
    a disk;
    a spindle motor to spin the disk; and
    at least one head arm assembly, wherein each of the head arm assemblies comprising:
    a slider;
    a drive arm;
    a trace; and
    a load beam having a hinge portion and a slider mounting portion, the load beam being a one-piece structure, wherein
    the slider mounting portion has a slider support to support flying attitude of the slider, the slider support portion has a slider mounting frame with a flexible lifter to maintain the slider position in a predetermined position, the flexible lifter has a spring structure, the slider mounting frame includes two side beams and a bottom beam to connect with the two side beams, the flexible lifter connects with the bottom beam, the flexible lifter includes a suspension tongue to support the slider and a connection part to connect the suspension tongue with the bottom beam, and the connection part displaces the suspension tongue into substantially parallel, but out-of-plane, relationship with the main body of the load beam.

10. A head arm assembly comprising:
    a slider;
    a drive arm;
    a trace; and
    a load beam having a hinge portion and a slider mounting portion, the load beam being a one-piece structure; wherein
    the slider mounting portion has a slider support portion to support flying attitude of the slider, the slider support portion has a slider mounting frame with a flexible lifter to maintain the slider position in a predetermined position, the flexible lifter has a spring structure, the load beam includes a connection portion, and the flexible lifter includes a front tongue part and a rear tongue part on the end of which a dimple is formed, the front tongue part being connected with the connection portion by two side beams and the rear tongue part extending from the connection portion directly.

11. A head stack assembly comprising:
    at least one head arm assembly; wherein each of the head arm assemblies comprising:
    a slider;

a drive arm;

a trace; and a load beam having a hinge portion and a slider mounting portion, the load beam being a one-piece structure, wherein the slider mounting portion has a slider support portion to support flying attitude of the slider, the slider support portion has a slider mounting frame with a flexible lifter to maintain the slider position in a predetermined position, the flexible lifter has a spring structure, the load beam includes a connection portion, and the flexible lifter includes a front tongue part and a rear tongue part on the end of which a dimple is formed, the front tongue part being connected with the connection portion by two side beams and the rear tongue part extending from the connection portion directly.

12. A disk drive unit comprising:

a disk;

a spindle motor to spin the disk; and at least one head arm assembly, wherein each of the head arm assemblies comprising:

a slider;

a drive arm;

a trace; and a load beam having a hinge portion and a slider mounting portion, the load beam being a one-piece structure, wherein the slider mounting portion has a slider support portion to support flying attitude of the slider, the slider support portion has a slider mounting frame with a flexible lifter to maintain the slider position in a predetermined position, the flexible lifter has a spring structure, the load beam includes a connection portion, and the flexible lifter includes a front tongue part and a rear tongue part on the end of which a dimple is formed, the front tongue part being connected with the connection portion by two side beams and the rear tongue part extending from the connection portion directly.

\* \* \* \* \*